(12) United States Patent
Ghose (10) Patent No.: US 9,063,721 B2
(45) Date of Patent: Jun. 23, 2015

(54) CONTINUOUS RUN-TIME VALIDATION OF PROGRAM EXECUTION: A PRACTICAL APPROACH

(71) Applicant: Kanad Ghose, Vestal, NY (US)

(72) Inventor: Kanad Ghose, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 2 days.

(21) Appl. No.: 14/027,352

(22) Filed: Sep. 16, 2013

(65) Prior Publication Data

US 2014/0082327 A1   Mar. 20, 2014

Related U.S. Application Data

(60) Provisional application No. 61/701,194, filed on Sep. 14, 2012.

(51) Int. Cl.
*G06F 9/30*     (2006.01)
*G06F 9/38*     (2006.01)
*G06F 11/00*    (2006.01)
*G06F 21/00*    (2013.01)
*G06F 21/50*    (2013.01)
*G06F 11/14*    (2006.01)

(52) U.S. Cl.
CPC ............ *G06F 9/30079* (2013.01); *G06F 21/50* (2013.01); *G06F 9/3877* (2013.01); *G06F 11/00* (2013.01); *G06F 21/00* (2013.01); *G06F 11/1407* (2013.01)

(58) Field of Classification Search
None
See application file for complete search history.

(56) References Cited

PUBLICATIONS

Arora et al., Hardware-Assisted Run-Time Monitoring for Secure Program Execution on Embedded Processors, IEEE, 2006.*
Healey et al., Dynamic Tracking of Information Flow Signatures for Security Checking, University of Illinois—Center for Reliable and High-Performance Computing, 2007.*
Oh et al., Control-Flow Checking by Software Signatures, IEEE, 2002.*

* cited by examiner

*Primary Examiner* — Minh Dinh
(74) *Attorney, Agent, or Firm* — Steven M. Hoffberg; Ostrolenk Faber LLP

(57) ABSTRACT

Trustworthy systems require that code be validated as genuine. Most systems implement this requirement prior to execution by matching a cryptographic hash of the binary file against a reference hash value, leaving the code vulnerable to run time compromises, such as code injection, return and jump-oriented programming, and illegal linking of the code to compromised library functions. The Run-time Execution Validator (REV) validates, as the program executes, the control flow path and instructions executed along the control flow path. REV uses a signature cache integrated into the processor pipeline to perform live validation of executions, at basic block boundaries, and ensures that changes to the program state are not made by the instructions within a basic block until the control flow path into the basic block and the instructions within the basic block are both validated.

25 Claims, 1 Drawing Sheet

Out-of-Order Datapath, The components needed by REV are shaded in orange.

Figure 1. A single module example with 5 basic blocks

Figure 2 – Out-of-Order Datapath, The components needed by REV are shaded in orange.

CONTINUOUS RUN-TIME VALIDATION OF PROGRAM EXECUTION: A PRACTICAL APPROACH

CROSS REFERENCE TO RELATED APPLICATIONS

The present application is a non-provisional of and claims benefit of priority from U.S. Provisional Patent Application No. 61/701,194, filed Sep. 14, 2012, the entirety of which is expressly incorporated herein by reference.

BACKGROUND OF THE INVENTION

A central requirement for implementing trusted computing platforms is to validate whether a program executing on a potentially untrusted host is really the program the user thinks it is. In an untrusted environment/host, a program may be compromised in many ways: through static or dynamic replacement of part or all of the binaries, or in the process of static or dynamic linking to untrusted library functions, or through attacks that affect calls and returns. With any of these compromises, the program does not correctly perform its intended functions. The detection of such compromises requires the execution of the entire program to be validated at run time, including the validation of called functions in libraries, the kernel and utilities.

Validating program executions at run-time is a difficult process. Despite the use of non-executable pages [Pax 11a] and address layout randomization (ASLR) [Pax 11b], applications remain vulnerable and an attacker can alter the control flow to take control of the victim applications [Krah 11, Par 10, Sul 06, HHF 09, Bra 08] as they execute. Hund et al. show that run-time attacks can bypass existing mechanisms for assuring the integrity of kernel code and install a rootkit successfully on a windows based system [HHF 09]. Even without any code modification attackers might take control of the application by using jump and/or return oriented programming [BJF+ 11, CDD+ 10, BRS+ 08]. Once a kernel flaw is introduced, it is possible to disable the existing security mechanisms, gain the full control of the victim system and inject code to the kernel memory space [Bra 08]. Digital Rights Management (DRM) applications are also subject to run-time attacks. DRM systems often run as a daemon on the host machine and verify the DRM certificates of the media being accessed and deny access to the copyrighted media in case of the violation on the digital rights specified in the certificate. Rather than getting around the verification and protection mechanism, run-time object code modification might be used to disable the calls to the verification system [Sul 06].

One way to validate the execution of a program is to continuously monitor all attempted changes/updates to the various software components in the program and the rest of the system including the operating system and libraries. The only changes that are permitted are the ones that have been certified as legitimate. Unfortunately, this approach results in a fairly closed system and program execution can be slowed down dramatically if changes to software components that are made at run-time need to be certified as the program executes. Existing approaches to validating the execution of a program include the use of hardware support in the form of the Trusted Platform Module (TPM) [TPM 12] for certifying executables prior to their execution as well as many other techniques that use control flow signatures at run time (Section 2.1).

RELATED WORK

The most common technique in use today for certifying an execution as genuine relies on the use of the trusted platform module [TPM 12] or a similar facility including a stand-alone cryptoprocessor within a tamper-proof package such as [IBM 10] to authenticate binaries prior to their execution. These techniques fail to detect compromises that occur at run-time. The Cerium co-processor [ChMo 03] validates the signature of cache lines dynamically on cache misses using a context switch to a micro-kernel, thus introducing a serious performance bottleneck. Moreover, Cerium assumes that all of the trusted code will fit into the CPU cache, an impractical assumption for contemporary systems. The SP-architecture [LKM+ 05] can detect run-time code modifications for instructions but it does not verify the control flow is thus incapable of detecting control flow attacks, such as the return oriented programming attacks. The SP-architecture also requires compiler support and new instructions. The AEGIS co-processor [Su+ 07] removes the vulnerability of CPU-external authentication logic and authenticates the trusted parts of the kernel and protects the local memory contents when required using one-time pads but does not facilitate efficient, continuous authentication of executing programs.

Existing software mechanisms for validating program execution within a remote host are directed at detecting security breaches at a remote server that executes programs on behalf of a client. Unfortunately, all of the existing software techniques, such as the techniques of [AG 08, KJ 03, SLS+ 05, Ka 07] for authenticating remote execution are limited in how extensively they validate execution. Most of these do not perform continuous validation as the program executes and all have adverse performance implications. Implementing a software solution for validating remote execution is an open area of research and only a few practical solutions have been proposed to date. A plethora of software techniques, including the use of hardware support [ZZP 04], have been explored in obfuscating control flow in a program to thwart code modifications, including mechanisms to protect the kernel code. In contrast, the present mechanisms provide a full and uniform mechanism to detect tampering of trusted infrastructure code (such as kernel, libraries, utilities) as well as user-level applications.

2.1 Run-Time Control Flow Authentication

Control flow authentication (CFA) has generally relied on validating control flow paths and/or validating the contents of basic blocks of instructions using cryptographic hashes for the basic blocks. Although these schemes are identical superficially in their use of basic block hashes [FL 04, GON+ 05, RP 06, ARR+ 06, MBS 07] the implementations differ significantly in terms of capabilities and implementation. Dynamic code certification has been proposed for software testing. In [SJ 87], compile time signatures are inserted in the binary and are verified by a coprocessor that examines blocks of fetched instructions; the work of [MBS 07] uses basic block signatures for the same purpose and are embedded into the literal fields of RISC instructions. In both schemes, the reference signatures are stored unencrypted, so the system can be easily compromised. In [GON+ 05], the authors propose the use of hash signatures on data and code blocks to authenticate the blocks as they are fetched using a FPGA-based coprocessor that holds the reference signatures. This scheme requires compiler support and new instructions for validation related functions. Also validation is based on register usage pattern and it is unclear if this check provides security against all types of control flow attacks. Context switches, interrupts and library functions, which are non-trivial, are not described in [GON+ 05].

Arora et al. [ARR+ 06] proposed a dynamic CFA mechanism for embedded systems using signature based control flow verification in embedded processors. The technique of

[ARR+ 06], along with preceding work on run-time binary validation (such as [FL 04, RP 06, MBS 07]) and the control flow authentication mechanism as proposed and evaluated in this paper use signatures for basic blocks. Thus, at a superficial level, this mechanism appears similar to the present mechanism. However, there are fundamental differences that have to do with the storage and use of the reference signatures, scalability and applicability in general to an OOO pipeline. In [ARR+ 06] CAM-tables, pre-loaded by the linker/loader, are used to hold the reference signatures for basic blocks. This introduces two limitations: first, one cannot have large tables to hold all of the basic block signatures of binaries encountered in general-purpose systems; second, context switches require table updates that are very slow and practically hard in most contemporary embedded systems. These problems are solved by using signature caches that are dynamically managed. Such caches require appropriate changes to an OOO pipeline as addressed in the present solutions. The work of [ARR+ 06] also requires source code access to insert explicit control flow instructions to mark the end of a basic block. The work of [ARR+ 06] also does not prevent stores from an illicit basic block from modifying memory. Finally, the performance overhead of [ARR+ 06] makes their adaptation to a general-purpose OOO processor unattractive. REV does not have any of these limitations and has a negligible performance overhead, making its adoption viable.

REM [FL 04] and IMPRES [RP 06] are two techniques that use keyed hashes to authenticate basic blocks (BBs) at run time. Both techniques do not validate how control flowed into a basic block, both require instruction binaries to be re-written and both require basic block hashes to be regenerated when the hash key is changed. REM also requires an ISA extension. The present technique validates both control flow into a BB as well the authenticity of instructions in a BB, without requiring ISA extensions, binary modification or hash regenerations when the key is changed. A re-encryption of the pre-generated hash values is required with key changes. In a recent paper [KZK 10], the authors propose the use of unique signatures for code traces. To avoid a performance penalty, not all of the possible traces in the code are covered—a certain percentage of the traces—the traces that are less likely to execute—are not authenticated. The traces that are not authenticated are not explicitly identified. Consequently, this proposed scheme is therefore not secure—one can replace a branch within a frequently executed trace and also alter any code within the trace to make it appear as a trace whose authentication is not needed, thereby failing to detect any code tampering.

Argus [MBS 07] primarily targets reliability issues and embeds basic block signatures into binaries. To adopt Argus for authenticating executions dynamically, the signatures will have to be encrypted and the delay of decrypting the reference signatures will have to be somehow absorbed as much as possible. Argus also embeds the signatures into unused fields of RISC instructions. For CISC ISAs this is not simple and either boundary tags or post decode information has to be used to extract out the reference signatures. This again adds to hardware complexity or validation delays. Binary rewriting is also avoided. The Argus approach presumably relies on compiler support to transform the binaries to have no more than 5 successors of a BB thereby introducing another requirement not present according to the present scheme. It is also unclear how Argus will support returns from a frequently called function from several locations with this limitation.

Control Flow Integrity (CFI) [ABE+ 09] is a software technique for validating control flow. It relies on the generation of unique basic block ids and their insertion and run-time validation using a proprietary tool. CFI assumes the kernel and kernel components are trusted and legitimate; thus CFI is not intended and unable to detect attacks at the kernel level. Rootkits can reset the NX bit and thus defeat CFI. Furthermore CFI does not validate the instructions along the control flow path; the present technique does that as well. CFI also has a significant execution overhead.

In [CXH+ 10], a software technique for detecting return-oriented attacks was introduced. This technique assumes that call and return instructions occur in pairs and that the scope of jumps within a function are limited to the boundary of the function and a function has one entry point. In [KOA+ 12], the authors introduce a technique called branch regulation (BR) that makes identical assumptions and use the same technique as the earlier work of [CXH+ 10], to ensure that returns transfer control to the caller, indirect jumps do not transfer control outside a function's boundary or jump into the middle of another function. These are precisely the same as the goals of the technique of [CXH+ 10], which the authors of [KOA+ 12] were apparently not aware of. The contribution of the work of [KOA+ 12] thus appears to be in the use of some modest hardware additions for implementing the basic technique of [CXH+ 10]. The techniques of both [CXH+ 10 and KOA+ 12] do not deal with kernel code (where there are several instances where control can transfer into a function at different points. Both assume that call and returns occur in pairs (and real exceptions to this have been acknowledged in [CXH+ 10]. BR assumes the entry of a hardware shadow stack to validate returns—but fail to address how extensions of this stack in memory can be protected against attacks. In turn, this implies that BR and the technique of [CXH+ 10] rely on the kernel code from being uncompromised. Finally, both BR and the work of [CXH+ 10] require binary modification; BR relies on user-supplied annotations and (presumably) static code analysis. The work proposed here does not have the same limitations as BR or the technique of [CXH+ 10]; neither does it make the same (unrealistic) assumptions nor does it assume that the kernel code is safe. Both of these techniques only detect return-oriented attacks and instructions along the control flow path are not validated.

SUMMARY AND OBJECTS OF THE INVENTION

The construction of trustworthy systems demands that the execution of every piece of code is validated as genuine—that the executed codes do exactly what they are supposed to do. Most systems implement this requirement prior to execution by matching a cryptographic hash of the binary file against a reference hash value, leaving the code vulnerable to run time compromises, such as code injection, return and jump-oriented programming, and illegal linking of the code to compromised library functions. A mechanism called REV (for Run-time Execution Validator) is provided that can be easily integrated into a contemporary out-of-order processor to validate, as the program executes, the control flow path and instructions executed along the control flow path. REV does not require any binary modification or any extension to the instruction set and uses a signature cache integrated into the processor pipeline to perform the live validation of executions, independent of the binary size. REV performs validations at basic block boundaries and ensures that changes to the program state are not made by the instructions within a basic block until the control flow path into the basic block and the instructions within the basic block are both validated. Evaluations using a detailed cycle-accurate microarchitectural simulator for an out-of-order pipeline implementing the X86 ISA demonstrate that the performance overhead of REV is limited to 1.93% on the average across the SPEC 2006 benchmarks, making it very attractive as a practical and complete mechanism for real-time validation of program executions.

Relatively simple hardware extensions to a mainstream style out-of-order superscalar processor that provides these capabilities may be provided to ensure trusted execution, with a tolerable performance overhead. This solution permits any kind of control flow compromise to be detected efficiently at run time in a timely fashion and prevents any adverse impact of any form. Specifically, this system and method not only validates that control is flowing along a legitimate path but also validates that the programs executed on the control flow path were the intended ones.

A simple hardware mechanism for an out-of-order (OOO) processor to validate the execution of a program continuously, as it executes in the face of any kind of control flow attack and any other compromises of the binaries, is provided.

A simple hardware mechanism that relies on the use of a signature cache for the continuous and complete validation of a program (and the library/kernel functions that it invokes) as the program executes is provided. ISA extensions, modifications to the binaries, source-code access, and compiler support are not required.

The system and methodology typically uses control flow information and a cryptographic hash of the instructions within a basic block to authenticate instructions. Alternately, a signature may be used that consists of just the control flow information or just the cryptographic hash of instructions within a basic block, to perform other types of validation, perhaps in conjunction with other information. Therefore, it is understood that these aspects of the technology are separate and discrete, and may be used together or independently, and may be used with other compatible technologies to provide security.

In a processor that uses a trace cache comprising instruction sequences that encompass one or more basic blocks, or information relating to decoded instructions, along a predicted control flow path, the cryptographic hash or the control flow information or both nay be stored from a prior execution of a trace as part of the trace cache entry, to avoid the need for regeneration of the signature information for a subsequent execution of the stored trace. The technique may be used in conjunction with a post-commit write queue that delays memory updates from a basic block pending the validation of execution of the basic block. This technique was evaluated using a detailed, cycle-accurate simulator for the X86-64 ISA and demonstrates that the performance penalty of the scheme is negligible in most cases and tolerable in the extreme instances within the SPEC 2006 benchmark suite.

It is therefore an object to provide a trustworthy processor for validation of code during runtime, comprising: an instruction pipeline configured to decode and execute instructions along a control flow path of a block; a signature generator configured to generate a signature of the control flow path and the instructions to be executed along the control flow path of the block; a signature cache configured to securely receive and store a set of valid signatures, including a signature of the instructions in the instruction pipeline; a validator configured to validate the signature of the control flow path and the instructions to be executed along the control flow path of the block against a signature from the signature cache corresponding to the instructions in the instruction pipeline; and a commit defer unit which ensures that changes to a program state are not made by the instructions executed along the control flow path of the block until the control flow path into the block and the instructions within the block are both validated.

It is also an object to provide a processor configured to validate code during runtime, comprising: an out-of-order instruction pipeline configured to decode and execute instructions along a control flow path of a block; a signature generator configured to generate a signature of both the control flow path and the instructions to be executed along the control flow path of the block concurrently with decoding of the respective instructions on the pipeline; a signature cache configured to securely receive and store a set of valid signatures, including a signature of the instructions in the instruction pipeline; a validator configured to validate the signature of the control flow path and the instructions to be executed along the control flow path of the block against a signature from the signature cache corresponding to the instructions in the instruction pipeline; and a commit defer unit which ensures that changes to a program state are not made by the instructions executed along the control flow path of the block until the control flow path into the block and the instructions within the block are both validated.

It is a further object to provide a method for trustworthy validation of code during runtime in a processor, comprising: decoding and executing instructions along a control flow path of a block in an instruction pipeline; generating a signature of the control flow path and the instructions to be executed along the control flow path of the block; securely receiving and storing a set of valid signatures in a signature cache, including a signature of the instructions in the instruction pipeline; validating the signature of the control flow path and the instructions to be executed along the control flow path of the block against a signature from the signature cache corresponding to the instructions in the instruction pipeline; and preventing changes to a program state by the instructions executed along the control flow path of the block until the control flow path into the block and the instructions within the block are both validated.

Another object provides a method of validating code in a processor during runtime, comprising: decoding and executing instructions along a control flow path of a block in an out-of-order instruction pipeline of the processor; generating a signature of both the control flow path and the instructions to be executed along the control flow path of the block concurrently with decoding of the respective instructions on the pipeline, with a signature generator; securely receiving and storing a set of valid signatures into a signature cache, including a signature of the instructions in the instruction pipeline; validating the signature of the control flow path and the instructions to be executed along the control flow path of the block against a signature from the signature cache corresponding to the instructions in the instruction pipeline; and ensuring that changes to a program state are not made by the instructions executed along the control flow path of the block until the control flow path into the block and the instructions within the block are both validated.

A module may be provided configured to compute a location of a respective valid signature based on an address of an instruction which commences the block, as determined by a set of instruction-fetching logical elements of the instruction pipeline.

The processor may further comprise at least one register configured to store information representing a location of at least a subset of executable modules used by an application, including libraries and operating system code, and a location of the set of valid signatures.

The processor may further comprise logic configured to determine an address of the set of valid signatures based on the contents of the at least one register, and an address of an instruction to be executed when a currently executing module transfers control to another module.

The processor may further comprise a hardware stack configured to store a set of return addresses for a sequence of call functions, wherein information stored in the hardware stack is used to validate the control flow path of the respective call functions. Logic may be provided to extend the hardware stack into random access memory accessible by the processor. The random access memory may be accessed by the processor through a cryptographic interface which is configured to ensure that information stored in the random access memory is not accessible or modifiable without detection absent secret information. The random access memory may be accessed by the processor through a memory fence interface. The hardware logic may be configured to dynamically expand and contract random access memory usage.

A memory write resulting from execution of a block may be stored in a buffer pending validation of the block, and then committed to memory after the block is validated.

The commit defer unit may defers changes to a program state until instructions and control flow paths of a plurality of consecutive blocks based on control flow branching information are validated.

The method may further comprise computing a location of a respective valid signature based on an address of an instruction which commences the block, as determined by a set of instruction-fetching logical elements of the instruction pipeline.

The method may further comprise storing information representing a location of at least a subset of executable modules used by an application in at least one register, including libraries and operating system code, and a location of the set of valid signatures.

The method may further comprise determining an address of the set of valid signatures based on the contents of the at least one register, and an address of an instruction to be executed when a currently executing module transfers control to another module.

The method may further comprise storing a set of return addresses for a sequence of call functions in a hardware stack, wherein information stored in the hardware stack is used to validate the control flow path of the respective call functions. The method may further comprise extending the hardware stack into random access memory accessible by the processor. The random access memory may be accessed through a cryptographic interface which ensures that information stored in the random access memory is not accessible or modifiable without detection absent secret information or through a memory fence interface. Random access memory usage for the stack may be dynamically expanded and contracted in dependence on an amount of information representing the stack.

A memory write resulting from execution of a block may be stored in a buffer pending validation of the block, and then committed to memory after the block is validated.

The method may further comprise deferring changes to a program state until instructions and control flow paths of a plurality of consecutive blocks based on control flow branching information are validated.

Another object provides a processor comprising: an instruction processing pipeline, having at least one pipeline phase between receipt of an instruction for processing and commitment of the instruction, being responsive to at least one control flow instruction; a signature generator, configured to generate a signature of at least one instruction cache line storing at least one instruction; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic. The processor may further comprise: a cache, having the cache line, configured to store instructions; the instruction processing pipeline being configured to receive a stored instruction from the cache for processing; a memory configured to store the encrypted reference signature corresponding to the at least one cache line stored; and decryption logic configured to decrypt the encrypted reference signature in dependence on the stored key, wherein the authorization logic is configured to selectively permit the instruction processing pipeline to contingently proceed with processing of the at least one instruction to a stage prior to commitment, in dependence on the signal from the verification logic, and only if the generated signature is successfully verified against the reference signature, authorizing commitment of the at least one instruction from the cache line.

The pipeline may have a latency between commencement of instruction processing and commitment of the instruction, and for at least one cache line content, the signature generator generates the signature of the at least one instruction in the cache line, the encrypted reference signature is decrypted, and the decrypted reference signature verified against the signature during the pipeline latency substantially without stalling the pipeline waiting for the signal from the verification logic.

The pipeline may have a latency between commencement of instruction processing and commitment of the instruction during which the instruction is decoded and prepared for commitment, further comprising logic configured to, if the verification logic fails to communicate a signal indicating permitted commitment of the at least one instruction, generate a fail signal, flush the pipeline of the at least one instruction from the cache line, and prevent the at least one instruction in the pipeline from commitment.

An instruction may be advanced through the instruction processing pipeline to a stage immediately prior to at least one of a decoding, a dispatch, and a commitment, and is thereafter contingently at least one of decoded, dispatched and committed, in dependence on the signal.

The at least one instruction may have an execution which is dependent on associated data present in the cache line, and the signature is dependent on the at least one instruction but not the data.

The authorization logic may selectively control the instruction processing pipeline to provide at least two alternate results of instruction commitment in dependence on the signal.

A table may be provided, configured to store a plurality of outputs of the verification logic for a plurality of different reference signatures.

The processor may further comprise: a second memory configured to store a second encrypted reference signature corresponding to at least one second instruction stored in the cache; and second verification logic configured to verify a decrypted second encrypted reference signature against a generated signature of the at least one second instruction stored in the cache, wherein the verification logic and the second verification logic are concurrently operative to verify the generated signature against the reference signature and the second generated reference signature against the second reference signature.

The processor may comprise a memory representing a defined state, and wherein selectively in dependence on the signal indicating a no permission for commitment of the at least one instruction, the processor assumes the defined state, and does not complete execution of the instruction.

The defined state may comprise a checkpoint state, wherein if the verification logic indicates a failure of verification of the decrypted reference signature against the generated signature, the processor rolls back to the defined checkpoint state.

The signature generator may compute a distinctive digest function of the cache line.

The signature generator may selectively generate the signature in dependence on at least a cache line virtual address and a cache line content.

The signature generator may produce a signature in which an incremental change in a cache line content results in a non-incremental change in the generated signature.

The signature generator may produce a signature in dependence on at least a cache line memory location content and an associated virtual address, wherein generated signatures for memory locations having identical content at sequential virtual addresses are generated by a secret algorithm configured to result in an a difficult to predict change in the generated signature, and wherein the generated signature has a digital size smaller than a size of the cache line from which it is derived.

The instruction processing pipeline may comprise at least branch prediction logic and speculative processing logic, wherein the signal corresponds to a branch misprediction, the processor being configured to initiate a rollback to a processor state prior to commencement of processing of an instruction whose verification failed.

The instruction processing pipeline may be configured to selectively commit an instruction independent of the output of the verification logic.

The instruction processing pipeline may be configured to selectively commit an instruction independent of the output of the verification logic, and subject to alternate instruction authentication logic.

The instruction processing pipeline may have a mode which selectively permits commitment of an instruction independent of a relation of the decrypted reference signature and the generated signature.

The processor may be further configured to store a state of at least one of the verification logic and the authentication logic in a storage location when a context is switched out, and to restore the state of the at least one of the verification logic and the authentication logic from the storage location when the context is resumed.

The instruction processing pipeline may be configured to process at least one instruction to compute a proposed change in state of an external memory, further comprising logic configured to signal a permitted change in the state of external memory selectively based on the signal from the verification logic.

A further object provides a processing method, comprising: generating a signature of at least one instruction cache line storing at least one instruction; storing a key adapted to decrypt an encrypted reference signature for the at least one instruction; verifying a decrypted reference signature against the signature; and selectively permit commitment of the at least one instruction in an instruction processing pipeline responsive to at least one control flow instruction and having a latency between receipt of an instruction for processing and commitment of the instruction, based on the verification. The method may further comprise storing an encrypted reference signature corresponding to the cache line; decrypting the encrypted reference signature in dependence on the stored key; and initiating processing of an instruction from the cache line, and thereafter permitting the instruction processing pipeline to proceed to a stage prior to commitment, and only if the generated distinctive signature is verified against the reference signature, authorizing commitment of the instruction. For at least one cache line content, the generated signature of the at least one instruction may be generated, the encrypted reference signature is decrypted, and the decrypted reference signature is verified against the signature, during the pipeline latency substantially without stalling the pipeline waiting for the verification. For at least one cache line content, the instruction processing pipeline may support an instruction processing pipeline stall if the verification is delayed.

The verification may permit commitment of the at least one instruction in the pipeline based on a partial match of the generated signature of the cache line with the decrypted reference signature.

The method may further comprise: storing a second encrypted reference signature corresponding to at least one second instruction stored in the cache; and verifying a decrypted second encrypted reference signature against a generated signature of the at least one second instruction stored in the cache memory, wherein the verifying of the instruction and the verifying of the second instruction proceed concurrently.

The method may further comprise storing a defined processor state, and selectively assuming the defined processor state, and preempting completion of execution of the at least one instruction in the instruction processing pipeline, in dependence on a result of the verifying.

The method may further comprise if the verifying fails to verify the decrypted reference signature against the generated signature, rolling back the processor state to a predefined checkpoint state.

The method may further comprise selectively generating the signature in dependence on a cache line virtual address and a cache line content.

The instruction processing pipeline may comprise branch prediction logic and speculative processing logic, wherein the verifying generates a signal corresponding to a branch misprediction, resulting in a rollback to a state prior to commencement of processing of an instruction whose verification failed.

The method may further comprise providing a mode in which the instruction processing pipeline selectively commits an instruction independent of the verifying.

The instruction processing pipeline may selectively commit an instruction independent of the verifying, and subject to alternate instruction authentication.

The method may further comprise storing a state of at least one of the verification logic and the authentication logic in a storage location when a context is switched out, and restoring the state of the at least one of the verification logic and the authentication logic from the storage location when the context is resumed.

The instruction processing pipeline may process at least one instruction to compute a proposed change in state of an external memory, and selectively permitting a change in the a of external memory based on the verification logic.

Another object provides a processor system comprising: a cache line signature generator, configured to generate a dynamic signature for a cache line of an instruction cache; verification logic configured to securely verify a reference signature for a respective cache line content against the dynamic signature; and an instruction processing pipeline having a plurality of sequential stages, configured to load an instruction from the cache line, speculatively execute the instruction in the plurality of stages prior to commitment, and selectively flush the pipeline in dependence on a signal prior to instruction commitment or permit instruction commitment, in dependence on a signal from the verification logic.

A further object provides a processor comprising: a cache memory, configured to store instructions; an instruction processing pipeline, configured to receive a stored instruction from the cache memory for processing, having a pipeline latency between commencement of instruction processing and commitment of execution of the instruction; a cache memory signature generator, configured to generate a distinctive signature of at least one cache line stored in the cache memory; a memory configured to store an encrypted reference signature corresponding to the at least one cache line stored in the cache memory; a secure storage location configured to store a key adapted to decrypt the encrypted reference signature; decryption logic configured to decrypt the encrypted reference signature in dependence on the stored key; verification logic configured to verify the decrypted reference signature against the generated distinctive signature; and authorization logic configured to selectively permit the instruction processing pipeline to contingently proceed with processing of the instruction to a stage prior to commitment, in dependence on an output of the verification logic, and only if the generated distinctive signature is verified against the reference signature, authorizing commitment of the instruction from the cache line.

The cache memory signature generator may generate a distinctive signature of at least one instruction stored in the cache memory during the pipeline latency.

The memory may be configured to store an encrypted reference signature corresponding to the at least one instruction stored in the cache memory, receives the encrypted reference signature before the commitment of the instruction.

The decryption logic may decrypt the encrypted reference signature during a period prior to at least one of decode, dispatch, or issue of the instruction.

Authorization logic may be provided, configured to selectively permit the instruction processing pipeline to contingently proceed in dependence on an output of the verification logic.

The verification logic may verify the decrypted reference signature against the generated distinctive signature prior to the commitment of the instruction.

An instruction may be allowed to commence advancement through the instruction processing pipeline before the generated distinctive signature of a cache line that contained the instruction is verified against a reference signature of the cache line.

An instruction may also be advanced through the instruction processing pipeline to a stage immediately prior to at least one of a decoding, a dispatch, and a commitment, and is thereafter contingently processed in dependence on the verification logic.

The processor may comprise an integrated circuit.

The secure storage location may be on a common integrated circuit with at least the instruction processing pipeline.

The secure storage location may be on a different integrated circuit from at least the decryption logic, further comprising logic configured to securely communicate information corresponding to the key to the decryption logic.

The authorization logic may selectively permit the instruction processing pipeline to contingently proceed only if the decrypted reference signature exactly matches the generated distinctive signature.

The authorization logic may selectively control the instruction processing pipeline to provide at least two alternate results in dependence on the verification logic.

The processor may further comprise a table configured to store a plurality of outputs of the verification logic for a plurality of different reference signatures.

The authorization logic may selectively suspend processing of an instruction in the instruction pipeline, prior to contingently proceeding, in dependence on an output of the verification logic.

The processor may further comprise decryption logic configured to decrypt instructions stored in the cache memory.

The processor may further comprise: a second memory configured to store a second encrypted reference signature corresponding to at least one second instruction stored in the cache memory; and second verification logic configured to verify a decrypted second encrypted reference signature against a generated distinctive signature of the at least one second instruction stored in the cache memory, wherein the verification logic and the second verification logic are concurrently operative to verify a generated distinctive signature against a reference signature.

The processor may further comprise an interface configured to receive at least the instructions and the encrypted reference signature from a memory external to the processor.

The authorization logic may be configured to initiate processing of an instruction, and to thereafter selectively permit the instruction processing pipeline to contingently proceed in dependence on an output of the verification logic.

The processor may comprise a memory representing a defined state, and wherein in dependence on an output of the verification logic, the processor assumes the defined state, and does not complete execution of the instruction.

If the verification logic indicates a failure of verification of the decrypted reference signature against the generated distinctive signature, the processor may roll back to a predefined checkpoint state.

The checkpoint state may be defined by hardware logic.

The checkpoint state may be defined by instruction codes whose execution has been previously verified.

The cache memory signature generator may compute a distinctive digest function of at least a portion of a cache line.

The cache memory signature generator may selectively generate the distinctive signature in dependence on a cache line virtual address and a cache line content.

The cache memory signature generator may produce a distinctive signature in which an incremental change in cache line content results in a non-incremental change in the generated distinctive signature.

The cache memory signature generator may produce a distinctive signature in dependence on a memory content and a memory virtual address, wherein generated distinctive signatures for memory locations having identical content at sequential virtual addresses results in an a difficult to predict change in the generated distinctive signature, and wherein the generated distinctive signature has a digital size smaller than a size of the cache line from which it is derived.

The instruction processing pipeline may comprise branch prediction logic and speculative processing logic, wherein the verification logic generates a signal corresponding to a branch misprediction with a rollback to a processor state prior to commencement of processing of an instruction whose verification failed.

The instruction processing pipeline may be configured to selectively commit execution of an instruction independent of the output of the verification logic.

The instruction processing pipeline may be configured to selectively commit execution of an instruction independent of the output of the verification logic, and subject to alternate instruction authentication logic.

It is a still further object to provide a processing method, comprising: receiving a stored instruction from a cache line in a cache memory for processing into an instruction processing pipeline, having a pipeline latency between commencement of instruction processing and commitment of execution of the instruction; generating a distinctive signature of the cache line; storing an encrypted reference signature corresponding to the cache line; securely storing a key adapted to decrypt the encrypted reference signature; decrypting the encrypted reference signature in dependence on the stored key; verifying the decrypted reference signature against the generated distinctive signature; and initiating processing of an instruction, and thereafter selectively permitting the instruction processing pipeline to contingently proceed to a stage prior to commitment, in dependence on the verifying, and only if the generated distinctive signature is verified against the reference signature, authorizing commitment of the instruction from the cache line.

The generated distinctive signature of at least one instruction may be generated during the pipeline latency.

An encrypted reference signature corresponding to the at least one instruction may be received during the pipeline latency.

The encrypted reference signature may be decrypted prior to at least one of decode, dispatch and issue of the instruction.

The instruction processing pipeline may contingently proceed in dependence on the verifying, and supports an instruction processing pipeline stall if the verifying is delayed.

The decrypting and verifying maybe capable of completion faster that the pipeline latency.

An instruction may be advanced through the instruction processing pipeline commencing before a generated distinctive signature of a cache line that contained the instruction is verified against a reference signature of the cache line.

An instruction may be advanced through the instruction processing pipeline to a stage immediately prior to at least one of a decoding, a dispatch, and a commitment, and is thereafter contingently processed in dependence on the verifying.

The instruction processing pipeline may contingently proceed with processing only if the decrypted reference signature exactly matches the generated distinctive signature.

The instruction processing pipeline may provide at least two alternate results in dependence on the verification.

The method may further comprise storing a plurality of verifying results in a table for a plurality of different instructions.

The method may further comprise suspending processing of an instruction in the instruction processing pipeline, prior to contingently proceeding, in dependence on the verifying.

The method may further comprise decrypting instructions stored in the cache memory.

The method may further comprise storing a second encrypted reference signature corresponding to at least one second instruction stored in the cache memory; and verifying a decrypted second encrypted reference signature against a generated distinctive signature of the at least one second instruction stored in the cache memory, wherein the verifying the instruction and verifying the second instruction proceed concurrently.

The method may further comprise initiating processing of an instruction, and thereafter selectively permitting the instruction processing pipeline to contingently proceed in dependence on the verifying.

The method may further comprise storing a defined state, and assuming the defined state, and preempting completion of execution of the instruction, selectively dependent on the verifying.

The method may further comprise, if the verifying fails to verify the decrypted reference signature against the generated distinctive signature, rolling back program execution to a predefined checkpoint state.

The checkpoint state may be defined by hardware logic.

The checkpoint state may be defined by instruction codes whose execution has been previously verified.

The distinctive signature may be generated based on a computed distinctive digest function of at least a portion of a cache line.

The distinctive signature may be selectively generated in dependence on a cache line virtual address and a cache line content.

The distinctive signature may be generated such that an incremental change in cache line content results in a non-incremental change in the generated distinctive signature.

The distinctive signature may be generated in dependence on a memory content and a memory virtual address, wherein distinctive signatures for memory locations having identical content at sequential virtual addresses results in an a difficult to predict difference in the generated distinctive signature, and wherein the generated distinctive signature has a digital size smaller than a size of the cache line from which it is derived.

The instruction processing pipeline may comprise branch prediction logic and speculative processing logic, wherein the verifying generates a signal corresponding to a branch misprediction, resulting in a rollback to a state prior to commencement of processing of an instruction whose verification failed.

The instruction processing pipeline may selectively commit execution of an instruction independent of the verifying.

The instruction processing pipeline may selectively commit execution of an instruction independent of the verifying, and subject to alternate instruction authentication.

It is another object to provide a processor comprising: an instruction processing pipeline, having at least one pipeline phase between receipt of an instruction for processing and commitment of execution of the instruction, being responsive to at least one flow control instruction; a signature generator, configured to generate a signature of at least one instruction; a secure storage location configured to store a key adapted to decrypt an encrypted reference signature for the at least one instruction; verification logic configured to verify a decrypted reference signature against the signature; and authorization logic configured to permit at least one of commitment of execution of the at least one instruction and flow control in response to the at least one instruction in the instruction processing pipeline, selectively based on a signal from the verification logic.

It is a still further object to provide a processing method, comprising: receiving a sequence of instructions for execution by a processor having an instruction processing pipeline, comprising a terminal flow control instruction; generating a hash associated with execution of the sequence of instructions; securely receiving a reference signature corresponding to a hash of a verified corresponding sequence of instructions; determining a correspondence between the hash and the reference signature; and selectively producing a signal, in dependence on a correspondence of the hash with the reference signature.

The reference signature may be encrypted, further comprising decrypting the encrypted reference signature with a secret key stored in a secure storage location.

The reference signature may be stored in a secure writable non-volatile memory on a circuit integrated with the instruction processing pipeline.

The sequence of instructions may comprise a sequence of instructions from an entry point to a next subsequent branch point.

The reference signature may correspond to a sequence of instructions between expected consecutive branch points substantially without unexpected flow control instructions.

The signal may selectively authorize commitment of the flow control instruction, and a correspondence between the hash and the reference signature is insufficient to authorize the commitment of execution of the flow control instruction if there is present in the sequence of instructions an unexpected flow control instruction between expected consecutive branch points.

A sequence of reference signatures may be stored in the memory for verifying consecutive segments of a program at runtime.

The reference signature may be generated by execution of a reference version of an executable program from which the sequence of instructions are derived.

Each legal flow path within a single execution module may be specified as a segment from an entry point or instruction that can change the flow of control to a next instruction that can change the flow of control, and wherein each segment has a predetermined reference signature.

The hash generator may compute a signature which is unique to the sequence of instructions.

The hash may comprise a hash of at least codes corresponding to instructions executed at the point when the last instruction in the sequence of instructions commits.

The hash may comprise a hash of at least codes corresponding to a behavior of the flow control instruction.

A plurality of reference signatures may be stored in encrypted form in a table. The table may have an entry for a plurality of flow control instruction in a program module that can change the flow of control, wherein the entry for each flow control instruction in the table stores one reference signature for each path that leads into the sequence of instructions which that instruction terminates.

The hash may be generated as a running hash over a sequence of instructions in the order committed, each sequence of instructions being terminated with a control flow instruction, and all of the instructions being in the control flow path, wherein the running hash is reset at the entry point of a software module or when a flow control instruction that terminates a sequence of instructions successfully commits.

A register may store an address of a last control transfer instruction, containing the address of the last committed control transfer instruction or the entry point into the sequence of instructions, if a control transfer instruction has not been encountered after commencing execution of the sequence of instructions.

The method may further comprise looking up an entry in a table for the respective sequence of instructions using an address of the flow control instruction that terminates the sequence, when the flow control instruction at the end of a sequence of instructions is committed.

The method may further comprise comparing a value in the register in parallel against a plurality of entries stored in the table.

The signal may be selectively generated if and only if exactly one of these addresses stored in the table matches the value stored in the register, and the verification logic compares a generated hash with a corresponding entry in the table, wherein the signal is selectively suppressed except when a single value in the table matches the value stored in the register.

The hash may be a function of a subset of each of a set of complete bit patterns representing individual instructions.

The method may further comprise prefetching a reference signature associated with a predicted flow control path.

The method may further comprise generating an interrupt, if the correspondence is insufficient, which invokes an appropriate handler that suspends further execution of the sequence of instructions, and restoring a known stable state or a previous checkpoint.

The method may further comprise logging execution details of the sequence of instructions into a secure memory if the correspondence is insufficient, without producing any updates to an architectural state.

The method may further comprise generating the hash in dependence on an accumulation of sequential flow control signatures in the course of executing a program.

The flow control instruction may correspond to a plurality of reference signatures, corresponding to a plurality of paths that lead into the sequence of instructions which the flow control instruction terminates.

The method may further comprise retrieving a reference signature based on an address of a flow control instruction, from a hash table storing a plurality of reference signatures indexed according to a flow control instruction address. The reference signatures may comprise at least one of: all or some of the bits in an address of flow control instruction; all or some of the bits in the address of the flow control instruction combined with information that indicates an outcome of an immediately preceding one or more flow control instruction; all or some of the bits in a computed flow control signature; all or some of the bits in the computed flow control signature combined with information that indicates the outcome of the immediately preceding one or more flow control instruction; a suitable combination of bits from the computed signature and the address of the flow control instruction; and a suitable combination of bits from the computed flow control signature and the address of the flow control instruction combined with information that indicates the outcome of the immediately preceding one or more flow control instruction.

The method may further comprise executing a program, and retrieving from a table of reference signatures of each legal flow control instruction in the program, the reference signature corresponding to the flow control instruction.

The hash may comprise a cryptographic produced in dependence on an input message and a secret key.

The method may further comprise receiving the reference signature in an encrypted form, storing a stored secret key, and determining the correspondence of the reference signature with the hash.

The method may further comprise selectively controlling the instruction processing pipeline in dependence on a mode, having a first mode in which the instruction processing pipeline processes the sequence of instructions dependent on the signal, and a second mode in which the instruction processing pipeline processes the sequence of instructions independent of the signal.

The method may further comprise producing an alternate signal representing an authorization of instruction execution independent of the signal, and controlling the instruction processing pipeline dependent on either the signal or the alternate signal.

The method may further comprise storing a state of at least one of the verification logic and the authentication logic in a storage location when a context is switched out, and restoring the state of the at least one of the verification logic and the authentication logic from the storage location when the context is resumed.

The method may further comprise processing with the instruction processing pipeline at least one instruction to compute a proposed change in state of an external memory, and signaling a permitted change in the state of external memory selectively based on the signal from the verification logic.

Another object provides a method comprising: receiving a sequence of instructions comprising a terminal flow control instruction for execution in a processor having an instruction processing pipeline; generating a signature associated with the sequence of instructions; securely receiving a reference signature for a verified corresponding sequence of instructions; determining a correspondence between the generated signature and the reference signature; and selectively controlling a processing of the sequence of instructions, in dependence on the correspondence of the generated signature with the reference signature.

A still further object provides a method for selectively controlling processing of a sequence of instructions having a flow control instruction in a processor having an instruction processing pipeline, the sequence of instructions having an associated reference signature dependent on the flow control instruction, comprising: generating a signature associated with the sequence of instructions proximately to and before to processing by the instruction processing pipeline; determining a correspondence between the generated signature and the reference signature to thereby authenticate the sequence of instructions; and controlling the instruction processing pipeline in dependence on the determined correspondence.

Another object provides a trustworthy processor for validation of code during runtime, comprising: an instruction pipeline configured to decode and execute instructions along a control flow path of a block; a signature generator configured to generate a signature of at least one of (a) the control flow path and (b) the instructions to be executed along the control flow path of the block; a signature cache configured to securely receive a valid signature of the instructions in the instruction pipeline; a validator configured to validate the signature against the valid signature from the signature cache; and a commit defer unit which ensures that changes to a program state are not made by the instructions executed along the control flow path of the block until the signature is validated.

A further object provides a processor configured to validate code during runtime, comprising: an out-of-order instruction pipeline configured to decode and execute instructions along a control flow path of a block; a signature generator configured to generate a signature of at least one of a trace cache storing a plurality of blocks, the control flow path of the block, and the instructions to be executed along the control flow path of the block, concurrently with decoding of the respective instructions on the pipeline; a signature cache configured to securely receive and store a set of valid signatures, including a signature associated with a content of the instruction pipeline or trace cache; a validator configured to validate the generated signature against a signature from the signature cache; and a commit defer unit which ensures that changes to a program state are not made by the instructions executed along the control flow path of the block until validation of the generated signature.

A still further object provides a method of validating code in a processor during runtime, comprising: decoding and executing instructions along a control flow path of a block in an out-of-order instruction pipeline of the processor; generating a signature of at least one of: a trace cache storing a plurality of blocks, the control flow path of the block, and the instructions to be executed along the control flow path of the block, concurrently with decoding of the respective instructions on the pipeline, with a signature generator; securely receiving and storing a set of valid signatures into a signature cache, including a signature of the instructions in the instruction pipeline; validating the generated signature against a signature from the signature cache; and ensuring that changes to a program state are not made by the instructions executed along the control flow path of the block until the generated signature is validated.

Another object provides a method for trustworthy validation of code during runtime in a processor, comprising: decoding and executing instructions along a control flow path of a block in an instruction pipeline; generating a signature representing a state of program elements prior to commitment of execution thereof by the instruction pipeline; securely receiving and storing a set of valid signatures in a signature cache; validating the signature of the state of program elements prior to commitment of execution thereof by the instruction pipeline against a corresponding signature from the signature cache; and preventing changes to a program state by the instructions executed along the control flow path of the block until the generated signature is validated.

It is also an object to provide a processor comprising: an instruction processing pipeline, having at least one pipeline phase between receipt of an instruction for processing and commitment of the instruction; a signature generator, configured to generate a signature of at least one instruction represented in at least one of the pipeline and a trace cache, prior to commitment of execution; a secure storage location configured to store a key adapted to decrypt an encrypted reference signature for the at least one instruction; verification logic configured to verify a decrypted reference signature against the signature; and authentication logic configured to permit commitment of the at least one instruction, selectively based on a signal from the verification logic.

An object also provides a processing method, comprising: generating a signature of at least a portion of an instruction cache; storing a key adapted to decrypt an encrypted reference signature for the at least a portion of the instruction cache; verifying a decrypted reference signature against the generated signature; and selectively committing at least one instruction of the at least a portion of the instruction cache, in an instruction processing pipeline having a latency between receipt of the at least one instruction for processing and commitment of the at least one instruction, based on said verification.

3.1 Requirements of Run-Time CFA for OOO Processors

Although architectural support run-time control flow authentication (CFA) has been proposed and evaluated in the past, the proposals have targeted embedded systems, where the overhead for such authentication is not crippling. This is not the case with out-of-order (OOO) processors and reducing the performance overhead of run-time CFA is critical in these CPUs. Furthermore, one cannot just extend the techniques devised for embedded systems, such as the techniques of [ARR+06, GON+05, ARR+06] to OOO CPUs in a simple way, as one has to take care of specific nuances of a typical OOO datapath. Specifically, one has to address the following requirements of a run-time CFA for an OOO CPU and for the technique in general:

R1. The technique should be scalable: arbitrarily large binaries and statically or dynamically linked libraries have to be handled. Thus, one cannot store reference signatures used for control flow validation in CPU-internal tables, as was done in [ARR+ 06].

R2. The technique should have as low a performance overhead as possible. In particular, the effect of following delays on overall performance should be minimized (i) generating the cryptographic hash of a BB, and comparing the target and source addresses should and, of (ii) fetching, decrypting and comparing the reference signature.

R3. The technique should be as transparent as possible to the executables. Most existing techniques require ISA extensions [FL 04, MBS 07, GON+ 05, ARR+ 06, RP 06] and some actually require the executables to be modified.

R4. The technique should support context switching, system calls as transparently as possible without imposing a large overhead. The techniques of [ARR+ 06, GON+ 05] do not meet this requirement: in [ARR+ 06], the processor internal table holding the reference signatures has to be reloaded on every context switch; a similar restriction applies to [GON+ 05].

R5. Changes to the permanent state of the system (committed registers, memory locations) made by instructions should be disallowed until the execution of these instructions are validated. All of the existing hardware-based CFA techniques fail to meet this requirement.

R6. Speculative instruction execution should be supported and instructions/authentications along a mispredicted path should be abortable. Existing CFA hardware do not address this requirement.

The present technology can be easily retrofitted to an existing OOO design, does not require any ISA extension and guarantees full binary compatibility of all executables, including the OS and libraries. Thus, Requirement R3 is met immediately.

DETAILED DESCRIPTION OF THE PREFERRED EMBODIMENT 4.1 REV: Validating Executions at Run-Time—Overview The proposed technique for control flow authentication and the authentication of instructions executed along the control flow path is called REV: Run-time execution Validator. In REV, the signature of each basic block of committed instructions is validated as the control flow instruction (branch, jump, return, exit etc.) terminating the basic block is committed. In addition to comparing the cryptographic hash function of the instructions in the basic block against a reference signature, that control flowed into the basic block along an expected path is validated by comparing the actual address of the target of branch instruction at the end of the current basic block.

Figure 1:
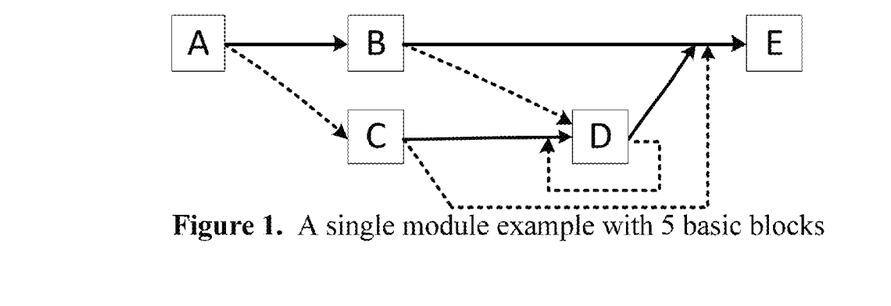
FIG. 1 depicts the basic blocks for a module.

FIG. 1 depicts a simple example, with the basic blocks for a module labeled as A, B, C. D and E. A is the block executed on entry into the module (which has a single entry point) and E is the exit block. The directed edges show the control flow paths. At the end of each basic block, conditional branch instructions as assumed, say, bA, bB, bC, bD and bE, respectively. The lower arrow coming out of each basic block shown in FIG. 1 corresponds to the branch at the end of the block being taken, while the upper arrow corresponds to the not-taken path. The run-time validation of the execution of this module requires the equivalent of the following information to be stored in the validation table: (i) the address of the successors (which are basic blocks themselves) of each basic block, (ii) the outcome of these branch (taken or not, or equivalent information as applicable)—this information, in some cases can be stored implicitly as the order in which the successors are listed and, (iii) the cryptographic hash of all instructions in a basic block, including the branch instruction at the end of each basic block. For example, the information needed for validating the execution of basic block D needs to hold two addresses for the branches bD, bE that lead the next basic block D or E as well as the cryptographic hash for the instructions within basic block D.

Figure 2:
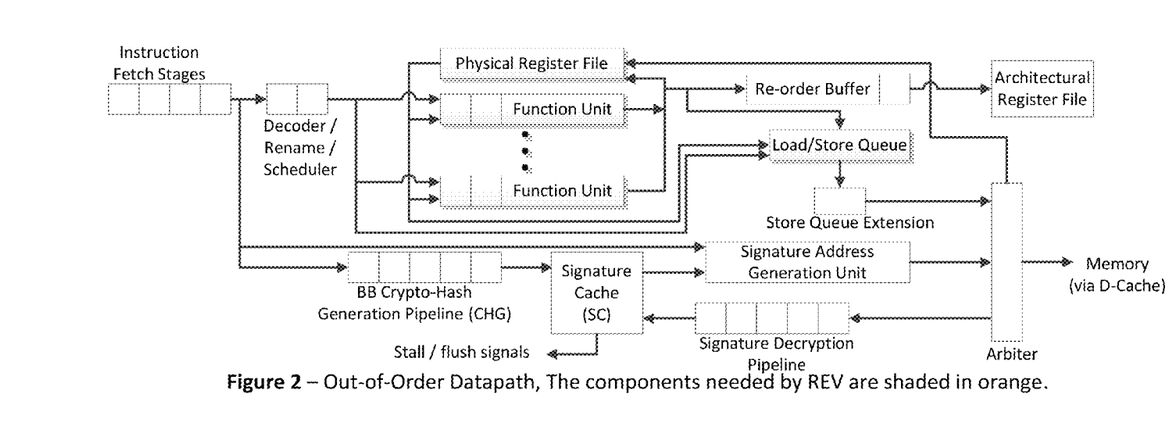
FIG. 2 depicts a typical out-of order execution datapath and it also shows the additional components needed for implementing a preferred embodiment.

FIG. 2 depicts a typical OOO datapath and it also shows the additional components needed for implementing the present scheme. The reference signatures of the BBs and the source/destination address pairs are stored in the main memory, encrypted with a secret key. As instructions are fetched by the front-end stages, they are fed into a pipelined crypto hash generator (CHG), which operates in parallel with the rest of the pipeline. Because of speculative execution and potential flushing of instructions along the mispredicted path, it makes sense to only validate control flow along the path of committed instructions. This post-commit validation permits the delay of the crypto hash generation to be effectively overlapped with the steps of instruction decoding, renaming, dispatch, issue, execution, writeback and commitment, thus meeting the first part of requirement R2. The post commit validation also meets Requirement R6 naturally.

A small on-chip cache, called the signature cache (SC), is incorporated to hold reference signatures that are retrieved from memory. Because of the temporal locality of reference, the SC eliminates the need to fetch the same reference signatures repeatedly from the memory, thus improving the overall performance. As instructions are fetched by the front end, the predicted target address of a branch is used to retrieve the reference signature of the target BB from the main memory via normal memory interface (going through the L1 D-cache and the rest of the on-chip hierarchy).

The use of the SC enables the scalability requirement (Requirement R1) to be met: the SC will only hold the recently-used (and likely-to-be-used) reference signatures and signatures of any executing modules are loaded into the SC as the code executes, unaffected by the size or the number of code modules used. The SC fetches the reference signatures for a BB based on the address of the fetched instruction if the signature does not already exist in the SC and decrypts the reference signature using a secret key as it is fetched. In practice, the delay of this decryption is hidden because of SC hits, hits in the on-chip cache hierarchy and the delay from fetching the first instruction of a BB to the time of validating the signature of the BB. Thus the second part of Requirement R2 is met.

The SC permits context switches to be handled naturally, as it automatically fetches signatures for the executing code thus meeting Requirement R4.

The CHG generates the signature of the instruction stream forming a basic block as the instructions are fetched along the path predicted by the branch predictor for the pipeline. When the last instruction of the current basic block is ready to commit (which is a control flow instruction), the SC will be probed to verify the calculated crypto hash value of the current basic block against the reference control flow signature. On a SC hit at this time, followed by a match of the control flow signature for the basic block, execution continues as usual. On a SC miss, the corresponding reference signature is retrieved into the SC and until a match is performed, the pipeline is stalled. On a signature mismatch an exception is raised and appropriate handlers are invoked.

To meet Requirement R5, the ROB is extended beyond the normal commit stage and also extend the store queue similarly, as shown in FIG. 2 to prevent changes to the precise state unless a BB is validated. Since these extensions have a finite capacity, the very rare BBs that contain a long sequence of instructions are broken up artificially into multiple BBs, limiting the number of stores or the total number of instructions within a BB (whichever occurs earlier). The front-end of the pipeline is aware of these limits and triggers SC fetches at these artificial boundaries instead of waiting for a control flow instruction to be fetched.

A much stricter approach to meeting Requirement R5 is to defer all changes to the system state until the entire execution has been authenticated. One way to do this is to employ the concept of page shadowing [NG 09]. Initially, the original pages accessed by the program are mapped to a set of shadow pages with identical initial content. All memory updates are made on the shadow pages during execution and when the entire execution is authenticated, the shadow pages are mapped in as the program's original pages. Also, while execution is going on, no output operation (that is DMA) is allowed out of a shadow page.

Memory accesses for servicing SC misses have a priority lower than that of compulsory misses to the data caches, but a higher preference than instruction misses and prefetching requests. If a branch misprediction is discovered, memory accesses triggered by SC fetches along the mispredicted path are canceled and the appropriate pipeline stages in the CHG are also flushed. Interrupts are handled like branch mispredictions. Interrupts flush instructions and results of the earliest basic block in the pipeline (that has not been validated) and resumes from the beginning of the basic block if the interrupt was generated by the BB itself. External interrupts are handled after completing validation of the current BB. The context structure in the Operating System (OS) holds the base address of the signature table in the Random Access Memory (RAM). A signature base register is used to point to the starting (=base) address of the RAM-resident signature table of the executing module (Sec. 4.4).

4.2 Supporting Cross-Module Calls

A single program module may call functions within a number of other independently compiled modules. These modules include shared components as well as statically or dynamically linked libraries/modules. Each such module will have its own encrypted signature table. As execution switches from one module to another, the register pointing to the base of the signature table has to be switched from that of the calling module's to that of the callee's. The specific hardware support for cross module calls is part of the signature address generation unit (SAG) shown in FIG. 2 and consists of a set of B base registers that contain the base addresses of the RAM-resident signature tables for up to B called modules. Associated with each such base register is a pair of limit registers that record the starting and the last virtual addresses of the corresponding module. For statically-linked modules, these base registers and the associated limit register pair are filled in by the linker (which is trusted). For dynamically linked modules, the base and limit register pairs are initialized on the first call to the dynamically linked module, when the jump vectors for the functions within the called dynamically-linked module is initialized. The usual (and trusted) dynamic linking function is extended to handle the base and limit-register pairs. At every call or return instruction, the address of the target is associatively compared against the addresses stored in all of the B limit register pairs. The base register for signatures that is selected for use is the one whose limit register values enclose the called functions entry address (or the return address).

The cross-module call support meets any remaining part of Requirement R1 that is not met by the SC and its associated logic. The Silicon requirements for B base address and limit register pairs and their associated comparators are fairly modest for small values of B (16 to 32). When more than B modules are involved, an exception is generated when none of the limit register pairs enclose the called/return address and the exception handler is invoked to manage the base-limit registers.

4.3 Signature Cache (SC) Details

A basic block is identified using the address of the last instruction in the basic block (referred to hereafter as "basic block address"). The SC is a set-associative cache that is accessed using the basic block address. An entry in the SC contains the full address of up to N successors of this basic blocks and the actual outcomes that direct control to flow out of the block, the decrypted crypto hash of the instructions in the basic block and status information that indicates if the decrypted reference signature is present within the entry and if the basic block has more than N successors. For the successor field values in the SC entry, the address of the very first instruction in the successor BBs is used. N has a small value (e.g., 2 used in simulations). If a basic block has more than N successors, only the entries for the N most recently used branches are maintained within the SC entry. This requires the use of additional logic to handle replacements within an SC entry.

As instructions of a basic block are fetched along the speculated execution path, they are fed into the CHG pipeline to compute the cryptographic hash for the basic block. To permit flushing of entries in the CHG, the inputs are tagged with the identification (ID) of the successor basic block along the predicted path. Prior to this, using the predicted target address of the prior branch as the lookup key, the signature cache is probed to determine if the decrypted reference signature and the address of the successor basic block are available in the SC. If both are available, a SC hit occurs and no further actions are needed. Two situations arise on a SC miss: one is a partial miss that indicates the presence of a matching entry with a decrypted reference signature but with no address listed for the successor basic block encountered along the predicted path. The other situation is a complete miss, where no matching entry is found in the SC. In either of these SC miss scenarios, a memory access, going through the normal cache hierarchy, is triggered to fetch the missing information into the SC. The authentication check in REV is invoked when the last instruction in a basic block commits and uses the generated hash signature, address and outcome of the successor basic block for the authentication check against the SC entry.

The data for the encrypted control flow signatures stored in the RAM is stored as a hash-indexed table. Recall that the address of the last instruction in the basic block is used to identify a basic block. This address is used to hash into this structure, computing the index as basic block address mod P, where P is chosen to minimize the conflict in the hash table. Details of the entries in this hash-indexed table are given in Section 4.4. A separate field is available in the entry to point to other entries that are in collision on hashing into the table. The entries in collision are entries for other basic blocks that share the common table index or additional entries for a basic block that has more than two successor basic blocks. The contents of the hash table are all encrypted using a secret key on a trusted host following an analysis of the program binaries. Note that in the course of fetching a signature (or other relevant information into the SC) multiple memory accesses may be required. Such accesses have been modeled correctly in simulations discussed below. When the last instruction in a basic block is committed, the SC is probed to verify the signature of the basic block, as described in Section 4.1.

Basic blocks ending with a return instruction are validated in two steps, the first being the validation of the crypto hash when the return instruction is processed and the second to validate the return instruction as a legitimate predecessor of the BB entered on a return, during the validation of that BB (Section 4.2).

4.4 RAM-Resident Encrypted Reference Signature Table

Each executable module has its own memory-resident signature table. The contents of this table are encrypted (Section 4.1). The format of storing the encrypted reference signatures in the memory have the legal branch addresses with the crypto hash values of the each basic block and exploits the fact that most basic blocks (other than those computed branches and the return instructions) have no more than two successors.

A naive way of verifying execution is to store the address of a control transfer instruction and the addresses of the target instruction. The signature table entry for a conditional branch will include its two possible targets, while that for an unconditional jump or a call instruction will have a single target. However, for a computed jump, all potential target addresses need to be listed in the entry. Likewise for a function that is called from multiple locations, the signature table entry for the return instruction terminating such a function should list multiple targets.

For an efficient implementation for lookups to the signature table entries in the RAM following a SC miss, the entries located using the hash indices need to be uniform in size. If each entry located using a hash index is restricted to have at most two target addresses, then a linked list needs to be used for entries that should hold the remaining targets for control flow instructions that require more than two targets. Following such links to locate a matching target address requires indirection through memory locations and will be thus prolong the process of retrieving a matching entry for the memory resident signature table on a SC miss. To avoid this performance penalty for return instructions that terminate a popularly called function, a BB ending with a return is validated in two steps: (a) only the crypto hash of the signature of the BB terminated by the return instruction is validated, but address of the return instruction is saved in a special latch internal to the SC mechanism; (b) when the control flow instruction that terminates the first basic block (say, RB) entered in the calling function following a return instruction, say R, is validated, the execution of the RB is validated in the usual way and simultaneously the address of R is validated. The expected address of R is stored as part of the entry for RB.

In the memory resident signature table (which is stored in encrypted form), entries are classified into several different categories (e.g., 24 types), corresponding basic blocks of different types. Examples of entry types used include, but not limited to the following or their appropriate combination: BB terminated with a conditional branch, BB terminating with (unconditional) jump and a call instruction, BB terminating with a return and also ending with a return, other BB ending with a return, BB entered following a return, BB entered following a computed branch, artificially terminated BB (used to limit number of queued memory writes pending validation) etc. The generic structure on an entry in the memory resident table (decrypted) is as follows:

<type tag>, <BB crypto hash value>, <6-bit hash tag discriminator>, <successor1>, <successor 2>, <other>.

An entry has a type tag field indicating the entry type, the crypto hash of the BB, the address or equivalent information (such as a branch offset) to determine the address of the first instruction in up to two successor BBs. As an entry in the memory resident signature table is located using a hash indexing scheme, the BB crypto hash value and the 6-bit hash tag discriminator are together used to serve as the hash tag to permit the unambiguous identification of the correct table entry for two control flow instructions whose addresses generate the same hash index. Note that the crypto hash value is used as part of the "hash tag"; the 6 additional discrimination bits deal with the case when two control flow instructions share the same hash index and the same crypto hash value—a very unlikely situation. The "other" in the entry contains a pointer to a spill area that lists additional successors and/or the address of a preceding return instruction (the last applicable only to BBs entered on a return) and the next entry, if any, that shares the same hash index (link to the so-called collision chain). The last element in an array of spill values associated with a single table entry is identified using a special tag value.

The primary entry located using a hash index and the following the collision chain links are identical in size, and depending on the entry type, some of the fields are unused. Wherever possible, these unused areas are used to serve as a spill space. Other techniques are also used to minimize the space requirement of the entries, such as using offsets instead of full addresses, listing branch outcomes implicitly, etc.

The signature address generation unit generates a memory address for the required signature table entry on a SC miss, based on the signature table's base address in the RAM (obtained from the signature address register of the executing module (Sec. 4.1)) and the hash of the address of the control flow instruction that terminates a BB (obtained from the front-end stages). Once the entry is retrieved, the two target addresses listed in the entry are compared with the address of the actual target (as predicted by the branch predictor for a conditional branch instruction or as computed for a computed branch or call or return). On a mismatch, additional entries in the spill area are progressively looked up following the link listed in the entry. If no matching entry is located, control is presumably flowing on an illegal path and an exception is generated.

4.5 Handling Computed Branches

Computed/indirect branches are generated in many instances by the compiler. Computed branches are treated just like conditional branches, with a "taken" outcome on every possible jump path. To use REV with arbitrary computed branches, one has to determine all potential legal targets of the branch. Sometimes this can be done through a profiling run, for each such identified target the signature data for the basic block that starts with the target instruction can be specified. Targets of indirect branches can also be identified. There are two broad ways to extract the legitimate source-target pairs for the indirect branch addresses [Par 10]: extracting through static analysis [HP 00, Ste 96] or by performing a program profiling runs, as many model-based solutions have done [FHSL 96, GJM 04, ZZPL 05]. The signature generator component extracts the branch source-target pairs through the static analyzer component; it has the limitation of branch discovery. However, once the subset of the legitimate undiscoverable branch source-target pairs are supplied to the signature generator, the signatures and basic blocks will be generated for runtime verification. An alternative hardware mechanism [LSL 09] also uses such profiling runs to train a mechanism to just authenticate indirect branches. Profiling runs were used for some of the SPEC benchmarks to identify the targets of indirect branches.

4.6 Handling Legitimate Self-Modifying Code

REV relies on basic block signatures derived from a static analysis and as such it cannot directly handle intentional dynamic binary modifications (self-modifying code). It is useful to note that such modifications are a perpetual threat to system security, as noted in several recent and past literatures [Bla 11, SJW+ 11, HHW+ 06, YJP 04]. However, there are real scenarios where binary modification is used intentionally for reasons of efficiency, such as by OS boot loaders and by Java just-in-time compilers. In such scenarios, the functions that perform the intentional binary modifications are assumed to be trustworthy (and are validated dynamically using REV). Consequently, it is expected and assumed that the modified binaries that these trusted functions produce are trustworthy themselves and when such modified binaries are run, the REV mechanism can be momentarily disabled by the OS. Of course, to the extent that self-modifying code can be predicted, these presumptions may be replaced with predicted block signatures.

Timing and Other Implications

The REV crypto generator (CHG, in FIG. 2) starts generating the hash of a basic block as soon as instructions are fetched (along the predicted path). This crypto hash value is needed for validating the instructions in the basic block after the last instruction in the basic block is committed. To completely overlap the delay of crypto hash generation, say H, with normal pipeline operations, one must ensure that in the worst case that H=S, where S is the number of pipeline stages in-between the final instruction fetch stage and the commit stage. In a typical high-end X86 implementation, S ranges from 12 to 22. In reality, instruction commitment can be delayed by additional cycles in the reorder buffer. For simulations, it was assumed that S is 16 and assumed the worst-case value of H as 16. Some SHA-3 candidates, including the cube hash algorithm can meet the latency requirement described above. For instance, a cube hash implementation with 5 rounds can meet the 16 cycle latency goal with parallel pipelines [Cub 12, TFK+ 10]. For a 5-round cube hash algorithm, it was also found that the crypto hash generated for the basic blocks of the SPEC 2006 benchmarks were very unique, with the collision rate of maximum in gamess with 24 out of 433116 unique basic blocks equal to $5 \times 10^{-5}$ collision rate and an average collision rate out of all SPEC benchmarks at 68 collisions out of 2783086 unique basic blocks total which is equal to $2.4 \times 10^{-5}$ collision rate. Alternatives to the cube hash are also described in [Sa 08, GHN+ 10, TFK+ 10], that describe low-latency pipelined hash generators with a latency ranging from 14 to 21 cycles, particularly the designs presented in [TFK+ 10] for 180 nm implementations. These designs can be further refined for lower latencies in contemporary 32 nm technology and realize a CHG that will not hold up usual commitments on a SC hit, an assumption made in the simulations discussed below. If the latency H of the CHG is higher, dummy post-commit stages can be added to the pipeline to effectively increase S to equal H. On a SC miss, whether partial or full (Section 4.3), pipeline stalls occur and such stalls are actually modeled in full detail in the simulator.

Depending on the particular cryptographic hash functions used (as reported in [TFK+ 10]), the area of the hash function generator, extrapolated to 32 nm implementations, can consume about 4% to 5.5% of the die area of a modern out-of-order core implementing the X86 ISA. With the decryption hardware, the SCs, the crypto hash address generator and the CHG, the die area increase resulting from the inclusion of the proposed additions for REV is likely to be about 8% with 32 Kbyte SCs, based on a very rough estimation. This increase in die size is believed to be an acceptable area overhead for the REV mechanism for a contemporary out-of-order processor.

Security of the Rev Mechanism

REV relies on the use of encrypted reference signatures for basic blocks to be stored in the RAM. This requires the use of secret keys for decrypting the reference signatures for each executable module. Such keys can be stored in secure key storage in the RAM that can be implemented using a TPM. The external TPM mechanism in contemporary system can be easily used [TPM 12]. An adversary may overwrite the memory locations for key storage—at best this will cause the validation effort to fail (Section 4.1) but this will never allow illicit code to be authenticated, as the secret key for decrypting the reference signature is held in secure locations. REV also requires two system calls. One of these is for loading the base addresses of the memory areas that contain the encrypted reference signatures into the special registers within the crypto hash address generation unit. The second system call is used to enable or disable the REV mechanism and this is only used when safe, self-modifying executables are run (Section 4.6). For REV to work properly, these two system calls must be secured as well.

This approach introduces a relatively simple hardware support for preventing any code injection attacks, either direct or indirect, any attack that could cause control flow misbehavior.

Conclusions

REV, a technique for control flow authentication that also validates instructions executed along the legal control flow paths in a modern out-of-order processing core is presented and evaluated. The technique addresses the practical needs of a contemporary system such as not requiring executables to be modified, the ability to support arbitrary executable sizes and to permit integration into existing OOO core designs. REV authenticates execution at the granularity of basic blocks and detects control flow compromises and binary compromises at run-time by validating the actual control flow path and instruction signatures at run time against reference information derived from a static analysis of the executables. REV thus validates both code integrity and control flow integrity simultaneously at run-time with a negligible performance overhead. REV also ensures that changes to the computation states are not made by the instructions in a basic block until the basic block and the control flow path into the basic block are simultaneously validated. To avoid any compromises in the validation, REV stores the reference information used for validation in an encrypted form in memory. REV thus offers a practical way to guarantee the authentication of any program execution, including applications, libraries and kernel code.

REV performs complete execution validation at run-time.

REV relies of the ability to derive a control flow graph of the program. For critical applications, it is possible to generate a CFG—perhaps even relying on the availability of the source code.

REV also limits run-time binary code modification to trusted functions (Section 4.6) and requires these functions to be validated as they execute. However, it is widely known that deliberate binary modifications in general makes a system vulnerable, so limiting binary modifications to trusted functions may not be a real impediment in security-conscious systems.

REV also requires additional memory space for holding the reference signature of the executables being verified. This is a reasonable price to pay for the continuous and complete validation of execution at run-time.

References (Each of which is Expressly Incorporated Herein in its Entirety)

[ABE+ 09] Abadi M., Budiu M., Erlingsson U., Ligatti J., "Control-flow integrity principles, implementations, and applications", ACM Transactions on Information and System Security (TISSEC), Vol. 13 Issue 1, 2009

[AG 08] Aktas, E., and Ghose, K., "DARE: A framework for dynamic authentication of remote executions", in Proc. of Annual Computer Security Applications Conference (ACSAC), pages 453-462, IEEE Press, 2008.

[ARR+ 06] Arora D., Rav S., Raghunathan A., Jha N., Hardware-Assisted Run-Time Monitoring for Secure Program Execution on Embedded Processors, IEEE Trans. On VLSI, December 2006 and earlier version published in Proc. DATE.

[BJF+ 11] Bletsch T., Jiang, X., Freeh V. W., et al. "Jump oriented programming: a new class of code-reuse attack", in Proc. ASIACCS, 2011

[Bla 11] Blazakis D., "Interpreter Exploitation: Pointer Inference and JIT spraying", available on the web at http://www.semantiscope.com/research/BHDC2010/BHDC-2010Paper.pdf.

[Bra 08] Brad S., "On exploiting null ptr derefs, disabling SELinux, and silently fixed Linux vulnerabilities", Dailydave List; 2008. http://grsecurity.net/~spender/exploit.tgz.

[BRS+ 08] Buchanan E., Roemer R., Shacham H., et al. "When Good Instructions Go Bad: Generalizing Return-Oriented Programming to RISC", in 15th ACM CCS, 2008

[CDD+ 10] Checkoway S., Davi L., Dmitrienko A., et al. "Return-oriented programming without returns", in 17th ACM CCS, 2010

[ChMo 03] Chen, B. and Morris, R., "Certifying Program Execution with Secure Processors", HotOS Conf., 2003.

[CXH+ 10] Chen P., Xing X., Han H., Mao B., Xie L., "Efficient detection of the return-oriented programming malicious code", ICISS'10 Proceedings of the 6th International Conference on Information Systems Security, pages 140-155, 2010

[FHSL 96] Forrest S., Hofineyr S., Somayajo A., Longstaff T. "A sense of self for unix processes", in Proceedings of the 2000 IEEE Symposium on Security and Privacy, 1996.

[FL 04] Fiskiran A., Lee R., "Runtime Execution Monitoring (REM) to Detect and Prevent Malicious Code Execution.", in Proc. of the IEEE Int'l Conf. on Computer Design, 2004.

[GHN+ 10] Guo, X., et al, "Fair and Comprehensive Performance Evaluation of 14 Second Round SHA-3 ASIC Implementations", in Proc. the $2^{nd}$. SHA-3 Candidate Conference, organized by NIST, 2010, available at: http://csrc.nist.gov/groups/ST/hash/sha3/Round2/Aug2010/documents/papers/SCHAUMONT_S HA3.pdf.

[GJM 04] Giffin J., Jha S., Miller B., "Efficient context-sensitive intrusion detection", in Proc. $11^{th}$ NDSS, 2004.

[GON+ 05] Gelbart, I., Ott, P., Narahari, B. et al, "Codesseal: Compiler/FPGA approach to secure applications", in Proc. of IEEE International Conference on Intelligence and Security Informatics, Atlanta, Ga., 2005, pp. 530-536.

[HHF 09] Hund R., Holz T., Freiling F, "Return oriented rootkits: Bypassing kernel code integrity protection mechanisms", in Proc. of Usenix Security Symposium, 2009.

[HHW+ 06] Hu W., Hiser J., Williams D, et al., "Secure and Practical Defense Against Code-injection Attacks using Software Dynamic Translation", in ACM Conference on Virtual Execution Environments, 2006.

[HP 00] Hind M., Pioli A. "Which pointer analysis should I use?", in Proc. of the International Symposium on Software Testing and Analysis, 2000.

[IBM 10] IBM Corporation, IBM 480X series PCIe Cryptographic Coprocessor product overview, available at: http://www03.ibm.com/security/cryptocards/pciecc/overview.shtml.

[Ka 07] Kauer, B., "OSLO: Improving the Security of Trusted Computing", in Proc. USENIX Security Symp. 2007.

[KJ 03] Kennell R., and Jamieson, L. H., "Establishing the genuinity of remote computer systems", in Proc. $12^{th}$ USENIX Security Symposium, USENIX Association, 2003.

[KOA+ 12] Kayaalp M., Ozsoy M., Abu-Ghazaleh N., Ponomarev D., "Branch Regulation: Low Overhead Protection Fron Code Reuse Attacks", 39th International Symposium on Computer Architecture (ISCA), 2012.

[Krah 11] x86-64 buffer overflow exploits described at: http://www.suse.de/~krahmer/no-nx.pdf

[Krah2 11] Buffer overflow exploit code at: http://www-.suse.de/~krahmer/bccet.tgz

[KZK 10] Kanuparthi, A. K., et al, "Feasibility Study of Dynamic Platform Module", in Proc. ICCD 2010.

[LKM+ 05] Lee R., Kwan P., McGregor J., Dwoskin J., Wang Z., "Architecture for Protecting Critical Secrets in Microprocessors", in Proc. of the 32nd Annual International Symposium on Computer Architecture, 2005.

[LSL 09] Lee G., et al, "Indirect Branch Validation Unit", in Microprocessors and Microsystems, Vol. 33, No. 7-8, pp. 461 468, 2009.

[MBS 07] Meixner A., Bauer M. E., Sorin D., "Argus: Low Cost, Comprehensive Error Detection in Simple Cores", Proc. MICRO 40, 2007

[NG 09] Nagarajan V., Gupta R., "Architectural Support for Shadow Memory in Multiprocessors", in Proc. ACM int'l Conf. on Virtual Execution environments (VEE), pp. 1-10, 2009.

[Par 10] Park Y., "Efficient Validation of Control Flow Integrity for Enhancing Computer System Security", PhD thesis, Iowa State University, 2010.

[Pax 11a] PaX webpages at: http://pax.grsecurity.net/

[Pax 11b] ASLR description on web pages at: http://pax.grsecurity.net/docs/aslr.txt.

[PTL 10] PTLsim X86 Simulator Distribution pages at: www.ptlsim.org.

[RP 06] Ragel R., Parameswaran S., "Impres: integrated monitoring for processor reliability and security", In $43^{rd}$ ACM/IEEE Design Automation Conference, 2006.

[Sa 08] Satoh, A., "ASIC Hardware Implementations for 512 bit Hash Function Whirlpool", in Proc. of the Int. Conf. on Circuits and Systems, pages 2917.2920, May 2008.

[SJ 87] Schuette, M. and Shen, J., "Processor Control Flow Monitoring Using Signatured instruction Streams", in, IEEE Transactions on Computers, Vol. C-36 No: 3, March 1987.

[SJW+ 11] Salamat B., Jackson T., Wagner G., Wimmer C., Franz M., "Runtime Defense against Code Injection Attacks Using Replicated Execution", in IEEE Trans. on Dependable and Secure Computing, Vol. 8 No:4, 2011,

[SLS+ 05] Seshadri, A., Luk, M., Shi, E. et al, "Pioneer: Verifying Code Integrity and Enforcing Untampered Code Execution on Legacy Systems", in ACM Symp. on Operating Systems Principles, 2005.

[Ste 96] Steensgaard B., "Points-to analysis in almost linear time", in Proc. POPL, 1996.

[Su+ 07] Suh, E. G., O'Donnell. C. W., and Devadas, S., "Aegis: A Single-Chip Secure Processor", IEEE Design and Test of Computers, vol. 24, no. 6, pp. 570-580, November-December 2007.

[Sul 06] Floating Licence Management, A Review of Flexlm available at: wob.iai.uni bonn.de/Wob/images/36311141.pdf, 2006.

[TFK+ 10] Tillich, S., Feldhofer, M., Kirschbaum, M., et al., "Uniform Evaluation of Hardware Implementations of the Round Two SHA-3 Candidates", in Proc. the $2^{nd}$. SHA-3 Candidate Conference, organized by NIST, 2010, available at: http://csrc.nist.gov/groups/ST/hash/sha3/Round2/Aug2010/documents/papers/TILLICH_sha3hw.pdf.

[TPM 12] Trusted Platform Module spec. at: http://www.trustedcomputinggroup.org/.

[YJP 04] Younan Y., Joosen W., Piessens F, "Code Injection in C and C++: A Survey of Vulnerabilities and Countermeasures", Technical Report, Katholieke Universiteit Leuven Dept. of Computer Science, Belgium 2004.

[ZZP 04] Zhuang, X., Zhang, T., and, Pande, S., "Hardware Assisted Control Flow Obfuscation for Embedded Processors", in Proc. Intl. Conf. on Compilers, Architecture and Synthesis for Embedded Systems (CASES) 2004.

[ZZPL 05] Zhang T., Zhuang X., Pande S., Lee W., Anomalous path detection with hardware support.", in Proc. of Int'l Conf. on Compilers, Architectures and Synthesis for Embedded Processors, 2005.

What is claimed is:

1. A processor configured to validate code during runtime, comprising:
   an instruction pipeline configured to decode and execute instructions along a control flow path of a block;
   a signature generator configured to generate a signature of both the control flow path and the instructions to be executed along the control flow path of the block concurrently with decoding of the respective instructions on the pipeline;
   a signature cache configured to securely receive and store a set of valid signatures, dynamically updated in dependence on at least the instructions along the control flow path, including a signature of the instructions in the instruction pipeline; and
   a validator, integrated into the instruction pipeline, configured to validate the signature of the control flow path and the instructions to be executed along the control flow path of the block against a signature from the signature cache corresponding to the instructions in the instruction pipeline.

2. The processor according to claim 1, further comprising a commit defer unit which ensures that changes to a program state are not made by the instructions executed along the control flow path of the block until the control flow path into the block and the instructions within the block are both validated.

3. The processor according to claim 1, further comprising a module configured to compute a location of a respective valid signature based on an address of an instruction which commences the block, as determined by a set of instruction-fetching logical elements of the instruction pipeline.

4. The processor according to claim 1, further comprising at least one register configured to store information representing a location of at least a subset of executable modules used by an application, including libraries and operating system code, and a location of the set of valid signatures.

5. The processor according to claim 4, further comprising logic configured to determine an address of the set of valid signatures based on the contents of the at least one register, and an address of an instruction to be executed when a currently executing module transfers control to another module.

6. The processor according to claim 1, further comprising a hardware stack configured to store a set of return addresses for a sequence of call functions, wherein information stored in the hardware stack is used to validate the control flow path of the respective call functions.

7. The processor according to claim 6, further comprising logic configured to extend the hardware stack into random access memory accessible by the processor.

8. The processor according to claim 7, wherein the random access memory is accessed by the processor through a cryptographic interface which is configured to ensure that information stored in the random access memory is not accessible or modifiable without detection absent secret information.

9. The processor according to claim 7, wherein the random access memory is accessed by the processor through a memory fence interface.

10. The processor according to claim 7, wherein the hardware logic is configured to dynamically expand and contract random access memory usage.

11. The processor according to claim 1, wherein a memory write resulting from execution of a block is stored in a buffer pending validation of the block, and then committed to memory after the block is validated.

12. The processor according to claim 1, wherein the commit defer unit defers changes to a program state until instructions and control flow paths of a plurality of consecutive blocks based on control flow branching information are validated.

13. The processor according to claim 12, wherein the instruction pipeline is an out-of order instruction pipeline.

14. A method of validating code in a processor during runtime, comprising:
   decoding and executing instructions along a control flow path of a block in an instruction pipeline of the processor;
   generating a signature of both the control flow path and the instructions to be executed along the control flow path of the block concurrently with decoding of the respective instructions on the pipeline, with a signature generator;
   securely receiving and storing a set of valid signatures into a signature cache, dynamically updated in dependence on at least the instructions along the control flow path, including a signature of the instructions in the instruction pipeline; and
   validating the signature of the control flow path and the instructions to be executed along the control flow path of the block against a signature from the signature cache corresponding to the instructions in the instruction pipeline, using a validator integrated into the instruction pipeline.

15. The method according to claim 14, further comprising ensuring that changes to a program state are not made by the instructions executed along the control flow path of the block until the control flow path into the block and the instructions within the block are both validated.

16. The method according to claim 14, further comprising computing a location of a respective valid signature based on an address of an instruction which commences the block, as determined by a set of instruction-fetching logical elements of the instruction pipeline.

17. The method according to claim 14, further comprising storing information representing a location of at least a subset of executable modules used by an application in at least one register, including libraries and operating system code, and a location of the set of valid signatures.

18. The method according to claim 17, further comprising determining an address of the set of valid signatures based on the contents of the at least one register, and an address of an instruction to be executed when a currently executing module transfers control to another module.

19. The method according to claim 14, further comprising storing a set of return addresses for a sequence of call functions in a hardware stack, wherein information stored in the hardware stack is used to validate the control flow path of the respective call functions.

20. The method according to claim 19, further comprising extending the hardware stack into random access memory accessible by the processor.

21. The method according to claim 20, wherein the random access memory is accessed through a cryptographic interface which ensures that information stored in the random access memory is not accessible or modifiable without detection absent secret information.

22. The method according to claim 14, further comprising storing a memory write resulting from execution of a block in a buffer pending validation of the block, and then committing the memory write to memory after the block is validated.

23. The memory according to claim 14, further comprising deferring changes to a program state until instructions and control flow paths of a plurality of consecutive blocks based on control flow branching information are validated.

24. A method for trustworthy validation of code during runtime in a processor, comprising:
  decoding and executing instructions along a control flow path of a block in an instruction pipeline;
  generating a signature of the control flow path and the instructions to be executed along the control flow path of the block;
  securely receiving and storing a set of valid signatures in a signature cache, including a signature of the instructions in the instruction pipeline, the stored set of valid signatures in the signature cache being dynamically updated in dependence on at least the instructions along the control flow path; and
  validating the signature of the control flow path and the instructions to be executed along the control flow path of the block against a signature from the signature cache corresponding to the instructions in the instruction pipeline, using a validator integrated into the instruction pipeline.

25. The method of claim 24, further comprising preventing changes to a program state by the instructions executed along the control flow path of the block until the control flow path into the block and the instructions within the block are both validated.

* * * * *